United States Patent
Antesberger et al.

(10) Patent No.: US 12,377,594 B2
(45) Date of Patent: Aug. 5, 2025

(54) SYSTEM FOR MANUFACTURING OF HONEYCOMB EXTRUSION DIES AND MANUFACTURING METHODS THEREOF

(71) Applicant: CORNING INCORPORATED, Corning, NY (US)

(72) Inventors: Timothy Eugene Antesberger, Vestal, NY (US); Dana Eugene Coots, Tioga, PA (US); Neil James Sidebottom, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 803 days.

(21) Appl. No.: 17/420,289

(22) PCT Filed: Jan. 6, 2020

(86) PCT No.: PCT/US2020/012337
§ 371 (c)(1),
(2) Date: Jul. 1, 2021

(87) PCT Pub. No.: WO2020/146245
PCT Pub. Date: Jul. 16, 2020

(65) Prior Publication Data
US 2022/0048234 A1   Feb. 17, 2022

Related U.S. Application Data

(60) Provisional application No. 62/791,427, filed on Jan. 11, 2019.

(51) Int. Cl.
*B29C 48/30*   (2019.01)
*B23C 1/06*   (2006.01)
(Continued)

(52) U.S. Cl.
CPC ............ *B29C 48/3001* (2019.02); *B23C 1/06* (2013.01); *B23C 3/30* (2013.01); *B23C 5/10* (2013.01);
(Continued)

(58) Field of Classification Search
None
See application file for complete search history.

(56) References Cited

U.S. PATENT DOCUMENTS

| 4,298,328 A | 11/1981 | Frost |
| 4,349,329 A | 9/1982 | Naito et al. |

(Continued)

FOREIGN PATENT DOCUMENTS

| CN | 103858063 A | 6/2014 |
| CN | 104364062 A | 2/2015 |

(Continued)

OTHER PUBLICATIONS

Chinese Patent Application No. 202080008792.0, Office Action dated Dec. 26, 2023, 5 pages (English Translation only), Chinese Patent Office.

(Continued)

*Primary Examiner* — Hwei-Siu C Payer
(74) *Attorney, Agent, or Firm* — Kevin M. Able; Joseph M. Homa

(57) ABSTRACT

A method of manufacturing an extrusion die (102, 152, 302). The method comprises providing the extrusion die (102, 152, 302), the extrusion die (102, 152, 302) having a plurality of die pins (154, 316) defining a plurality of slots (156, 320), the plurality of die pins (154, 316) having an initial die pin width and an initial die pin depth and the plurality of slots having an initial slot width (Ws) and an initial slot depth (Ds), providing a micro-milling machine (104) with a spindle (122), providing a micro-cutting tool
(Continued)

(120) coupled to the spindle (122), mounting the extrusion die (102, 152, 302) proximate the micro-cutting tool (120), and removing material from one or more die pins (154, 316) using the micro-cutting tool (120), the micro-cutting tool (120) making one or more cutting passes against the one or more die pins (154, 316) to remove the material. Micromilling apparatuses and further methods are provided, as are other aspects.

18 Claims, 10 Drawing Sheets

(51) Int. Cl.
| | | |
|---|---|---|
| | *B23C 3/30* | (2006.01) |
| | *B23C 5/10* | (2006.01) |
| | *B23C 5/12* | (2006.01) |
| | *B29C 48/11* | (2019.01) |
| | *B29C 48/345* | (2019.01) |

(52) U.S. Cl.
CPC ............... *B23C 5/12* (2013.01); *B29C 48/11* (2019.02); *B29C 48/345* (2019.02)

(56) References Cited

U.S. PATENT DOCUMENTS

| | | |
|---|---|---|
| 4,373,895 A | 2/1983 | Yamamoto et al. |
| 4,519,734 A | 5/1985 | Mitchell et al. |
| 4,722,819 A | 2/1988 | Lundsager |
| 5,397,420 A | 3/1995 | Sakakibara et al. |
| 7,162,787 B2 | 1/2007 | Frost |
| 8,419,508 B2 | 4/2013 | Cady et al. |
| 8,847,114 B1 * | 9/2014 | Shin .................. B23K 26/0093 |
| | | 219/121.75 |
| 2001/0013510 A1 | 8/2001 | Wiener-Avnear et al. |
| 2004/0150133 A1 | 8/2004 | Bernas et al. |
| 2004/0168288 A1 * | 9/2004 | Rahman .................. B23H 9/00 |
| | | 29/35.5 |
| 2006/0178769 A1 | 8/2006 | Brew et al. |
| 2011/0052745 A1 * | 3/2011 | Corbett .................. B29C 48/11 |
| | | 425/464 |
| 2012/0045973 A1 | 2/2012 | Folmar et al. |
| 2015/0025667 A1 | 1/2015 | Shindo et al. |
| 2015/0098771 A1 | 4/2015 | Mekid |
| 2016/0136633 A1 | 5/2016 | Watanabe et al. |
| 2018/0243839 A1 | 8/2018 | Wielandts |
| 2022/0048234 A1 * | 2/2022 | Antesberger ........ B29C 48/3001 |

FOREIGN PATENT DOCUMENTS

| | | |
|---|---|---|
| CN | 108698252 A | 10/2018 |
| KR | 10-0527816 B1 | 11/2005 |
| WO | 2008/135454 A1 | 11/2008 |
| WO | WO-2019232150 A1 * | 12/2019 ............ B23P 15/243 |
| WO | WO-2020236474 A1 * | 11/2020 ............ B28B 3/269 |

OTHER PUBLICATIONS

International Search Report and Written Opinion of the International Searching Authority; PCT/US2020/012337; dated Jul. 21, 2020; 15 pages; European Patent Office.

EP Examination Report, 20703331.7, dated Sep. 19, 2024, 7 pages, European Patent Office.

Zoltan et al., "A review on micro-milling: recent advances and future trends", The International Journal of Advanced Manufacturing Technology, vol. 112, No. 3-4, pp. 655-684.

* cited by examiner

SYSTEM FOR MANUFACTURING OF HONEYCOMB EXTRUSION DIES AND MANUFACTURING METHODS THEREOF

This is a national stage application under 35 U.S.C. § 371 of International Application No. PCT/US2020/012337, filed on Jan. 6, 2020, which claims the benefit of priority under 35 U.S.C. § 119 of U.S. Provisional Application No. 62/791,427 filed on Jan. 11, 2019, the content of which is incorporated herein by reference in its entirety.

FIELD

Embodiments of the disclosure relate to honeycomb extrusion dies and methods of manufacturing honeycomb extrusion dies.

BACKGROUND

Honeycomb extrusion dies are manufactured with slots that require accuracy in manufacturing.

SUMMARY

Disclosed herein in one aspect is a system for manufacturing a honeycomb extrusion die comprising a micro-milling apparatus configured and adapted to perform a micro-milling operation on a honeycomb extrusion die or on a workpiece to form the honeycomb extrusion die.

In some embodiments, the micro-milling apparatus comprises a micro-milling machine comprising: a spindle, and a micro-cutting tool coupled to the spindle; and the extrusion die comprises a plurality of die pins defining a plurality of slots, the extrusion die secured proximate the micro-cutting tool.

In some embodiments, a micro-milling apparatus comprises a micro-milling machine with a micro-cutting tool coupled to a spindle, the spindle configured to rotate the micro-cutting tool at a rotation rate greater than or equal to 150,000 RPM and an extrusion die secured proximate the micro-cutting tool, the extrusion die comprising a plurality of die pins defining a plurality of slots having an initial slot width and an initial slot depth. The micro-cutting tool is operated to remove at least a portion of at least some of the plurality of die pins.

In some embodiments a method of manufacturing an extrusion die is provided. The extrusion die may be useful in the manufacture of an extruded honeycomb structure. The method of manufacturing comprises providing an extrusion die, the extrusion die having a plurality of die pins defining a plurality of slots, the plurality of die pins having an initial die pin width and an initial die pin depth and the plurality of slots having an initial slot width and an initial slot depth; providing a micro-milling machine with a spindle; providing a micro-cutting tool coupled to spindle; mounting the extrusion die proximate the micro-cutting tool; and removing material from one or more die pins from the plurality of die pins using the micro-cutting tool, the micro-cutting tool making one or more cutting passes against the one or more die pins to remove the material.

In some embodiments a method of manufacturing an extrusion die is provided. The method of manufacturing comprises providing an extrusion die body; providing a micro-milling machine with a spindle; providing a micro-cutting tool held by the spindle; mounting the extrusion die body proximate the micro-milling machine; and removing material from the extrusion die body with the micro-cutting tool to form one or more die pins individually with the micro-cutting tool by making one or more cutting passes into the extrusion die body.

In some embodiments, a method of manufacturing an extrusion die is provided. The method comprises mounting an unfinished extrusion die in a micro-milling machine proximate a micro-cutting tool, the micro-cutting tool coupled to a spindle of the micro-milling machine; and removing material from one or more die pins of the extrusion die using the micro-cutting tool, the micro-cutting tool making one or more cutting passes against the one or more die pins to remove the material.

In some embodiments, a method of manufacturing is provided for an extrusion die comprising an outlet face that comprises over one thousand pins separated by a plurality of intersecting non-straight slots, without use of an electrode.

In some embodiments, a method of manufacturing an extrusion die is provided. The method comprises collecting location information related to die features of an extrusion die with an integrated vision system of a micro-milling apparatus; generating a die feature location map from the location data; generating a numerical control file defining a cutting path for a micro-cutting tool of the micro-cutting apparatus; controlling movement of a tool arm connected to the micro-cutting tool to move the micro-cutting tool along the cutting path; and machining the unfinished extrusion die by individually and independently forming or modifying a plurality of pins of the extrusion die with the micro-cutting tool as the micro-cutting tool traverses the cutting path.

BRIEF DESCRIPTION OF THE DRAWINGS

The accompanying drawings, which are included to provide a further understanding of the disclosure are incorporated in and constitute a part of this specification, illustrate embodiments of the disclosure and together with the description serve to explain the disclosure.

DETAILED DESCRIPTION

Figure 1:
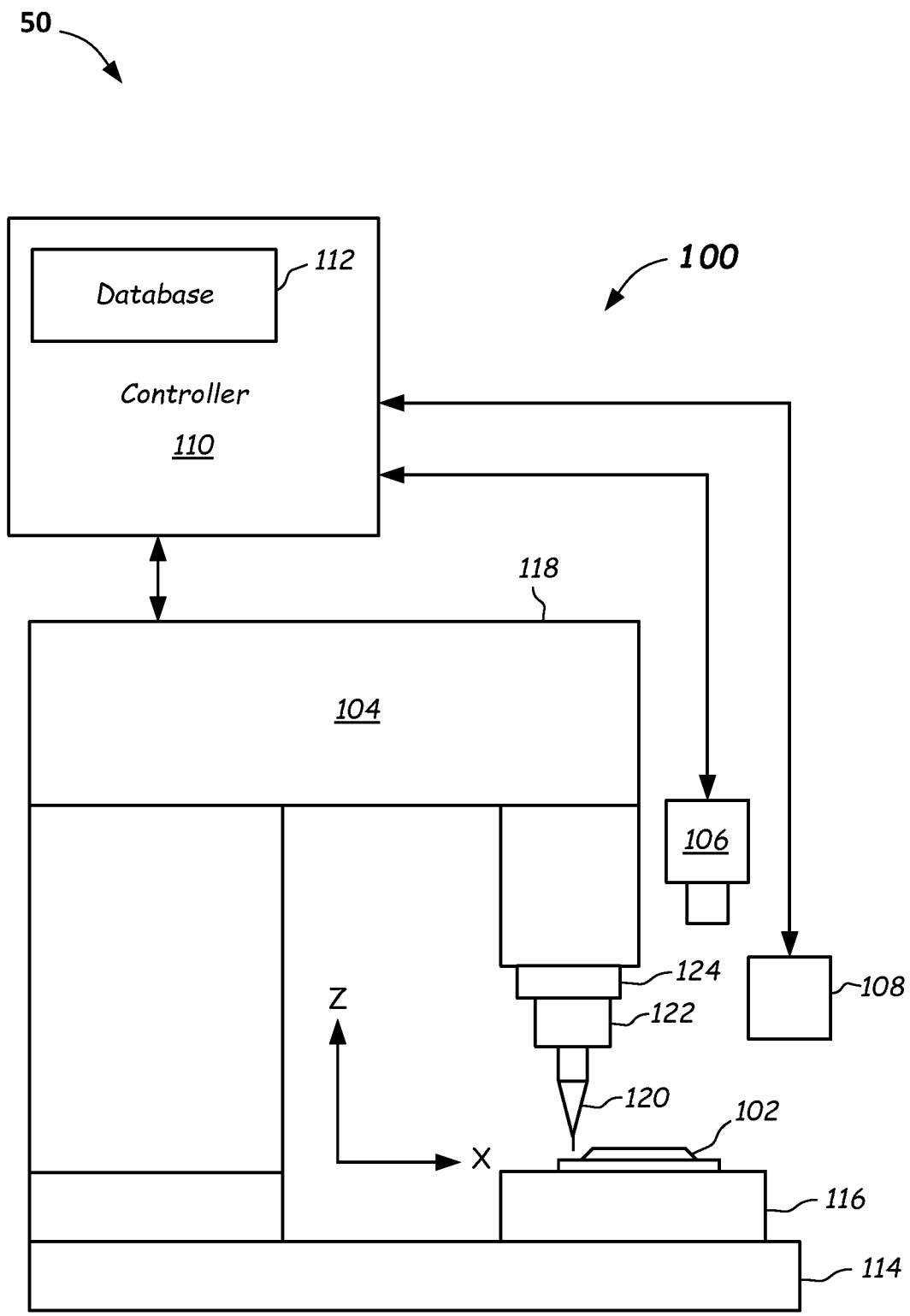
FIG. 1 illustrates a schematic view of a system for manufacturing a honeycomb extrusion die comprising a micro-milling apparatus used in the manufacture of the honeycomb extrusion die according to embodiments of the disclosure.

Honeycomb bodies produced via extrusion from a honeycomb extrusion die can be utilized in a number of applications. For example, catalyst materials supported on high surface area structures defined by or within honeycomb bodies (ceramic substrates) can be used to treat exhaust gas from internal combustion engines. As another example, e.g., in the case of diesel engines and some gasoline engines, a catalyzed or uncatalyzed particulate filter, such as a diesel particulate filter or gasoline particulate filter, can be used for the removal of particles from a fluid flow stream. Porous ceramic flow-through honeycomb bodies (comprising unplugged channels) and wall-flow honeycomb bodies (comprising channels plugged and unplugged alternatingly at opposite ends of the honeycomb body) can be used in these applications. Such substrates and filters are formed from honeycomb bodies comprising honeycomb structures made up of a matrix of interconnected porous walls.

A honeycomb body comprising a honeycomb structure can be formed from a batch mixture containing inorganic and organic materials. For example, a suitable batch mixture can comprise ceramic particles or ceramic precursor particles, or both, an organic binder, a liquid vehicle (e.g., deionized water), and optional processing aids, such as a pore former, and/or other additives. After being formed, the body is fired, wherein the batch mixture is transformed (e.g., sintered) into a porous ceramic material. The porous ceramic material can comprise cordierite, aluminum titanate, alumina, mullite, silicon carbide, silicon nitride, and the like, and combinations thereof.

The honeycomb structure can be formed by an extrusion process where the batch mixture is extruded into an extruded body comprising a honeycomb structure, which is then dried and fired to form a final ceramic honeycomb body. The extrusion can be performed using any suitable extruder. For example, the extruder can be a hydraulic ram extrusion press, a twin screw extruder, or an extruder apparatus having multiple coupled extruders to perform co-extrusion.

Honeycomb extrusion dies employed to produce such honeycomb structures can be multi-component assemblies including, for example, a wall-forming die body, which can be optionally combined with a skin-forming mask. For example, U.S. Pat. Nos. 4,349,329 and 4,298,328 provide examples of extrusion die structures that comprise skin-forming masks. The extrusion die body can incorporate batch feed passages leading to, and intersecting with, an array of discharge slots formed in a die face, through which the batch mixture is extruded. The extruded batch mixture, upon exiting the extrusion die, forms a matrix of interconnecting thin walls forming a honeycomb structure. In some embodiments, a skin-forming mask can be employed to form an outer peripheral skin around the matrix comprising the honeycomb structure, and the mask can be a ring-like circumferential structure, such as in the form of a collar, which during extrusion defines the periphery of the honeycomb body.

The honeycomb structure formed from the extruded batch mixture can be cut to create honeycomb bodies that are shaped and sized to meet the needs of the corresponding end use or end user, such as engine manufacturers. The honeycomb body can alternatively comprise a plurality of joined honeycomb segments, wherein the segments can be bonded together to form a final honeycomb body.

In some embodiments, the die pins of a honeycomb extrusion die are manufactured with precision geometric features to help provide for improved flow control through the extrusion die and/or for improved strength in the extruded honeycomb structure and/or final ceramic honeycomb body. Geometric features can be included within slots to help improve batch flow uniformity, isostatic equilibrium, and knitting. Further modifications to the die pins defining the slots, such as step cuts, can be included to help reduce skin separation from the matrix as well as to improve isostatic strength of the honeycomb body. Further, such geometric features can improve die robustness relative to differential flow rates in the peripheral region of the extrusion die.

Typical manufacturing techniques for honeycomb extrusion dies with die pins involve wire and/or plunge electrical discharge machining ("EDM") or combinations thereof. In the plunge EDM method, a precision electrode is fabricated with a configuration of a die pin geometric feature to be manufactured formed thereon. This precision electrode is then applied to an extrusion die via plunge EDM to remove material and create one or more precision geometric features on the die pins of the extrusion die. The plunge EDM method further involves management of the plunge process to account for electrode loss and other changes during the EDM process. However, because of the inherent variability involved with EDM spark gaps, electrical conductivity, and electrode wear, the precision of the plunge EDM process can be limited, such as to a tolerance range of 0.0003 inches (0.00762 mm) to 0.0005 inches (0.0127 mm). For thin wall honeycomb bodies having wall thickness on the order of 0.004 inch (0.1 mm) this level of tolerance can be appreciable and can lead to flow irregularities in some cases. Advantageously, the micro-milling systems and methods disclosed herein enable tolerances of less than 0.0001 inches (0.003 mm), which is less than possible by prior techniques. More particularly, precision resulting from the currently disclosed micro-milling systems and methods are on the order of 0.00004 inch to 0.0001 inch (0.001 mm to 0.003 mm) or less. Additionally, the micro-milling systems and methods disclosed herein enable the manufacture of extrusion dies, even non-straight slot extrusion dies having complex geometries (e.g., over one thousand or more pins), without the need for an electrode.

Accordingly, improved methods of manufacturing geometrical features on die pins of extrusion dies are desired. As such, embodiments of extrusion dies disclosed herein comprise die pins with geometric feature modifications that have been applied using a micro-milling apparatus configured and adapted to perform a micro-milling operation on an extrusion die. The micro-milling apparatus comprises a micro-milling machine with a micro-cutting tool coupled to a spindle and an extrusion die secured proximate the micro-cutting tool. The extrusion die can comprise a plurality of die pins defining a plurality of slots having an initial slot width and an initial slot depth. The spindle can rotate the micro-cutting tool at a defined rotational rate wherein one or more cutting passes can be made against the die pins to cause precision material removal therefrom. The micro-milling apparatus can be arranged as a laser-assisted micro-milling apparatus, that is, comprising a laser that heats the workpiece to weaken a portion of the workpiece immediately before machining of that portion with the micro-cutting tool.

In some embodiments, the micro-milling machine comprising the micro-cutting tool can be used to fully form the slot geometry in a non-straight slot extrusion die. That is, a "non-straight slot" extrusion dies comprises slots that cannot be formed in a straight line extending across an entire row of pins of the die. Thus, while segments of a slot can be individually arranged along respective straight line segments, the slot as a whole cannot be formed along a straight line that extends across the face of the die. As a result, wire EDM or abrasive disc slotting cannot be used to manufacture non-straight slot dies. Non-straight slot dies include, for example, hexagonal cell honeycombs having hexagonal cells or octa-square cell configurations (including combinations of square and octagonal cells), etc. For example, the slot between hexagonal cells, octagonal cells, etc., is not arranged in a straight line along an entire row of pins, but instead zigzags along a row of pins.

Further details of the micro-milling apparatuses and improved systems and methods of manufacturing geometrical features on extrusion dies and on die pins of extrusion dies are described with reference to FIGS. 1-9 herein.

FIG. 1 illustrates a schematic view of a micro-milling system 50 comprising an extrusion die 102 and a micro-milling apparatus 100 that can be used in the manufacture of the extrusion die 102 according to embodiments of the disclosure. It is to be appreciated that reference to an "extrusion die" (such as "the extrusion die 102") generally includes reference to an extrusion die at any stage of manufacture, e.g., to both a finished extrusion die (coated or uncoated) as well as an extrusion die precursor that is ultimately formed into a finished extrusion die (such as a blank of metallic material (e.g., steel) or a partially finished workpiece). In some embodiments, some portions or features of the extrusion die 102 are initially manufactured by another method, such as wire EDM, disc grinding, and the like, and the die pins thereof can then be modified in accordance with the micro-milling methods and using the micro-milling systems and apparatuses described herein. In some embodiments, the micro-milling apparatus 100 comprises a micro-milling machine 104, a controller 110, and memory 112 (e.g., comprising a database) included with the controller 110 (or optionally separately therefrom). In some embodiments, the micro-milling apparatus 100 optionally comprises an integrated vision system 106 and/or a tool dimension analyzer 108.

In some embodiments, the micro-milling machine 104 comprises a machine table 114. A workpiece holding device 116 can be received on and fixedly mounted to the machine table 114 by any suitable clamping or attachment mechanisms. The micro-milling machine 104 can further comprise a tool arm 118 that holds and/or controls movement of a micro-cutting tool 120 as discussed herein. The workpiece holding device 116 and the tool arm 118 can each be secured to any of multiple locations relative to one another, such as along the length and width of the machine table 114.

The workpiece holding device 116 can be configured to securely hold the extrusion die 102 that is to be micro-milled by the micro-milling machine 104. The pressure to hold the extrusion die 102 can be generated by a screw mechanism, pneumatics, hydraulics, cams, etc. In some embodiments, the tool arm 118 provides the ability to hold multiple tools and/or air turbine spindles that can be automatically changed at some specified frequency to continue cutting. For example, in one embodiment the controller 110 comprises software instructions that are executed by the controller 110 to control automatic changeover between multiple different tools and/or spindles.

The tool arm 118 provides computerized numerical control and motion of the micro-cutting tool 120 that is coupled to the tool arm 118 via a spindle 122. The spindle 122 can be rotated and thus rotate the micro-cutting tool 120 at a defined rotational rate (e.g., set or controlled by the controller 110). As an example, the spindle 122 can be an air turbine spindle or a machine spindle although other types of spindles can be used. The spindle 122 can be mounted to the automatic tool change arm 118 using a spindle clamp 124 or other spindle attachment mechanism.

The spindle 122 can be configured to rotate the micro-cutting tool 120 at a defined rotational rate that enables the micro-milling of precise geometric features into portions (e.g., sides of one or more die pins) of the extrusion die 102. In some embodiments, the rotational rate can range from 100,000 RPM to 250,000 RPM. In some embodiments, the rotational rate can be greater than or equal to 150,000 RPM.

Figure 2A:
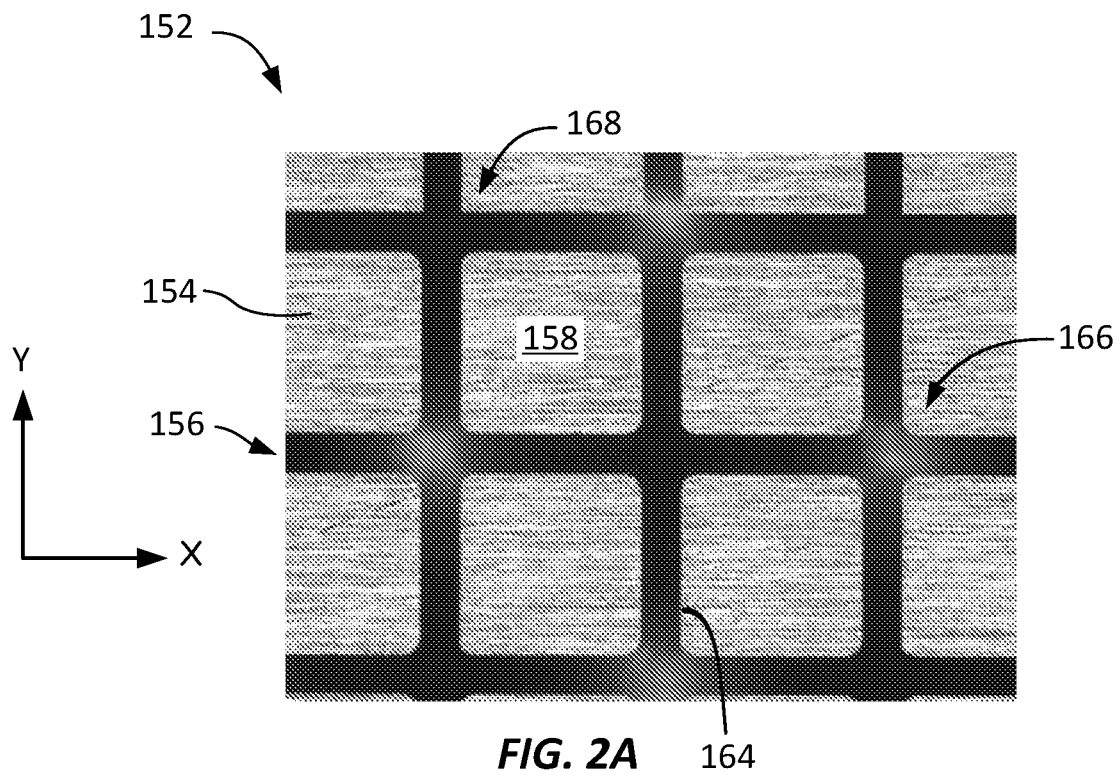
FIG. 2A illustrates a front view of a portion of an extrusion die having a plurality of slots and pins that can be manufactured according to embodiments of the disclosure.

A front view of an extrusion die 152 is illustrated in FIG. 2A. It is to be understood that the extrusion die 152 is merely one specific example of the extrusion die 102, and thus, any description of the extrusion die 102 generally applies to the extrusion die 152. Likewise, potential features, components, and details that can be implemented in or by the extrusion die 102 can be better appreciated in view of the description of the extrusion die 152.

Figure 2B:
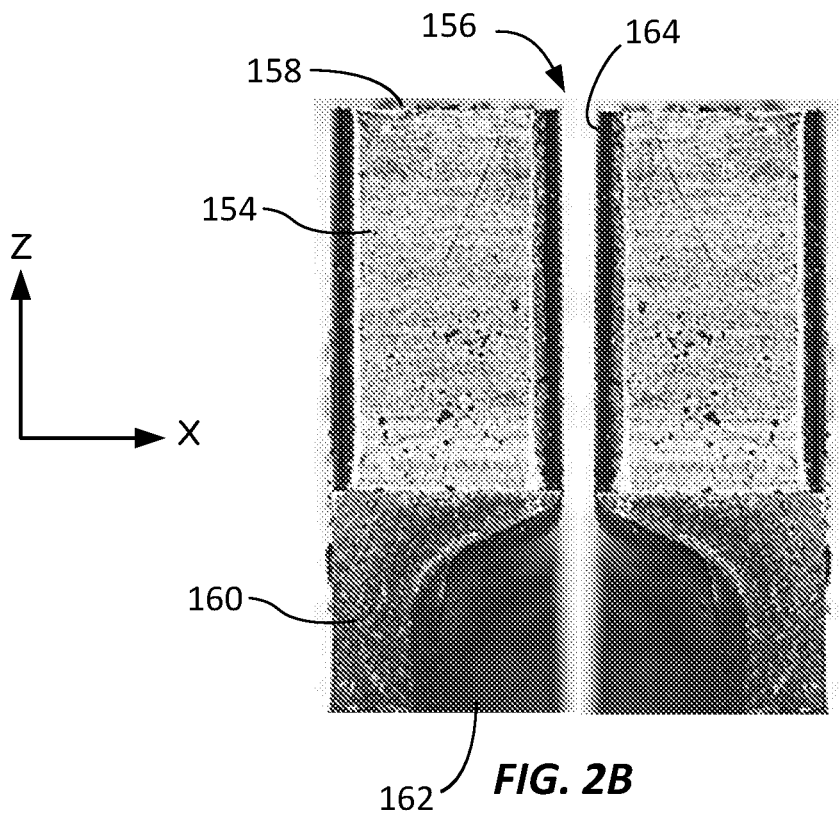
FIG. 2B illustrates a side view of a pin of the extrusion die of FIG. 2A according to embodiments of the disclosure.

The extrusion die 152 comprises a plurality of pins 154 separated by slots 156. A side view of a pair of the pins 154 is illustrated in FIG. 2B. The extrusion die 152 can comprise hundreds or thousands of the pins 154 separated by dozens of the slots 156 arranged in intersecting rows and columns. Each of the pins 154 comprises a face 158, which together form an outlet face for the extrusion die 152, through which material is extruded to form a honeycomb structure. Each of the pins 154 comprises a body that extends from the faces 158 to a root 160 that is connected to a body of the extrusion die 152 through which feedholes 162 are formed. The slots 152 can intersect or overlap with the feedholes 162 to enable material fed to an inlet face (not shown) of the extrusion die 152 under pressure to be discharged through the slots 152.

Each of the pins comprises a plurality of side surfaces 164. In the illustrated embodiment, the faces 158 of the pins 154 are square, so each of the pins 154 comprises four of the side surfaces 164. It is to be appreciated that the shape of the faces 158 of the pins 152 defines the corresponding shape of the channels in the honeycomb structure formed by the extrusion die 152. Additionally, it is noted that the extrusion die 102 can comprise pins having differently shaped faces, e.g., triangular, octagonal, hexagonal, circular, wedged, etc. for forming honeycomb structures with differently shaped channels.

As discussed in more detail herein, each of the pins 152 can be individually and independently machined by the micro-milling apparatus 100. The methods and systems disclosed herein can be utilized to add a variety of precision geometric features to the extrusion die 102. For example, as can be seen in FIG. 2A, some of the pins 154 have been modified by the micro-milling apparatus 100 to have rounded corners 166 (i.e., by engaging the cutting tool of the apparatus 100 against the surfaces 164 to remove material). Other pins can be machined to include different dimensions or features, e.g., squared corners 168. As also discussed in more detail herein, the micro-milling systems and methods disclosed herein can be utilized to yield different surface finishes.

In one embodiment, the root 162 in FIG. 2B has a first surface finish or roughness formed by a first manufacturing technique, e.g., abrasive wheel slitting or EDM, while the side surfaces 164 extending from the faces 158 of the pins have a second surface roughness or finish resulting from the micro-milling apparatus 100. As shown in FIG. 2B, the first surface finish is significantly rougher than the second surface finish. It is to be appreciated that the rotational speed (set by the spindle 122) and feed rate (set by movement of the tool arm 118) can be altered to provide rougher or smoother finishes, e.g., with smoother finishes generally resulting from faster rotational speeds and slower feed rates. In some embodiments, different ones of the side surfaces 164, or the side surfaces 164 of different ones of the pins 154 are given different surface finishes.

In some embodiments, the slots 156 are first rough-cut by the first manufacturing technique (e.g., abrasive wheel slitting, EDM, etc.) and the side surfaces of the pins are then finished by the micro-milling apparatus 100. In some embodiments, the slots 156 are cut via a first pass with the micro-milling apparatus 100, and then the side surfaces 164 of the pins 154 are finished with one or more subsequent passes. In embodiments utilizing multiple passes (either of just the micro-milling apparatus 100 or the micro-milling apparatus as a finishing pass following another manufacturing process such as abrasive wheel slitting, EDM, etc.), the cutting width or diameter of the tool can be selected as purposefully smaller than the desired width of the slots (e.g., at least 0.0005 inches smaller) to ensure sufficient material remains on the pins for removal in the subsequent passes.

During a micro-milling operation, the rotating micro-cutting tool 120 can be positioned by the tool arm 118 against surfaces (e.g., side surfaces such as the side surfaces 164 or other surfaces) of the extrusion die 102 that are to be milled. Micro-milling, as used herein, means machining (e.g., milling) with the micro-cutting tool 120. As an example, the micro-cutting tool 120 rotated at a defined rotational rate can be applied against one or more side surfaces of the extrusion die, and in some embodiments against one or more die pins that define slots within the extrusion die 102 (e.g., as discussed above with respect to the pins 154 of the extrusion die 152). In some embodiments, the tool arm 118 can move a cutting portion of the rotating micro-cutting tool 120 over side surfaces of die pins in the extrusion die 102 in a manner and sequence that creates one or more precision geometric features on one or more of the die pins. In other embodiments, the automatic tool change arm 118 can move a cutting portion of the rotating micro-cutting tool 120 against a die blank to produce die pins for both straight and non-straight configurations of the extrusion die 102.

The precision geometric features, in some embodiments, comprise a step cut that is micro-milled into one or more side surfaces of the die pins of the extrusion die 102, as discussed in more detail below. Other types of geometric features can be micro-milled into the die pins. In some embodiments, geometric features can be applied to extrusion dies 102 that are configured with die pin densities used to manufacture honeycomb structures with cell densities ranging from 100 cells per square inch (cpsi) to 900 cpsi (15.5 to 139.5 cells/cm$^2$). In particular, the micro-milling operations can be applied to thin-walled honeycomb extrusion dies having cell densities of 400 cpsi (62 cells/cm$^2$) or higher, or even to thin-walled honeycomb extrusion dies having cell densities of 600 cpsi (93 cells/cm$^2$) or higher. Accounting for any shrinkage (and in some cases, growth) of the honeycomb body as the honeycomb body is fired (e.g., up to 15% shrinkage and/or up to 2% growth, depending on the material composition of the material used to form the honeycomb body), the extrusion die 102 will have a similar number of "pins per square inch" to the cpsi of the produced honeycomb body.

In some embodiments, the integrated vision system 106 enables precise determination of information on a location of components (e.g., die pins) that are to be micro-milled by the micro-milling apparatus 100. The integrated vision system 106 can be positioned proximate to, and suitably focused on, the extrusion die 102 to gather location data (e.g., image data) on the configuration and orientation of the extrusion die 102 as it is secured within the workpiece holding device 116. For example, the integrated vision system 106 can be used to capture location data of the die pins and/or slot (e.g., location and surface geometry) within the extrusion die 102 that are to be micro-milled.

The integrated vision system 106 comprises one or more sensors that enables one or more selected or assigned dimensions of the extrusion die 102 to be measured. In some embodiments, the sensor(s) of the integrated vision system 106 determine distances utilizing any applicable technology or combination of technologies, such as optical cameras, laser sensors, touch probes, etc. Thus, it is to be appreciated that the integrated vision system 106 need not need to optically "see" the extrusion die 102, but rather, to collect data representative of the locations of features of the extrusion die 102.

In one embodiment, the controller 110 comprises software instructions that control the operation of the integrated vision system 106 and/or that interpret and convert the raw data gathered by sensors of the vision system 106 into distance measurements. In this way, features of the extrusion die 102, such as the size and shape of the pins, the width of the slots, etc. can be precisely measured by the integrated vision system 106 and these distances communicated to other components of the apparatus 100 to control manufacture of the extrusion die 102.

In one embodiment, a die pin location map (e.g., in an X-Y plane as shown in FIG. 2A) can be generated using the image data captured by the integrated vision system 106 and stored in the memory 112. The die pin location map can determine locations and lengths utilizing any desired coordinate system or combination of coordinate systems, such as a cardinal coordinate system (e.g., having X, Y, and Z axes), a polar coordinate system, etc. The die pin location map can be used by the apparatus 100 to determine both the placement of each die pin relative to the other die pins as well as the dimensions of each die pin. The angle, orientation, and/or length of each of the four sides defining the face of each pin can be determined via the measurements gathered by the integrated vision system 106. For example, if the ideal shape for the face of each die pins is a square (with or without radiused corners, as in FIG. 2A) having four straight sides of equal length at 90-degree angles with respect to each other, the die pin location map can be used to determine whether the sides have any irregularities, whether any of the sides are not equal in length to the others, whether any of the corners between two sides are not at the designated angle, etc. It is to be appreciated that other features of the extrusion die 106 can be mapped in other die feature location maps. Using the generated die feature location map (e.g., a die pin location map), precision geometric features can be accurately located (e.g., centered) on the die pins or other features within the extrusion die 102 that are to be micro-milled.

Additionally, the die pin location map disclosed herein enables each of the die pins to be individually and independently located and machined to final dimensions. Of note, honeycomb extrusion dies, such as the extrusion die 102, can have over a thousand if not thousands of individual pins. Advantageously, regardless of the number of pins (or other features) of the extrusion die, the currently disclosed systems and methods employing an integrated vision system enable the dimensions of each pin (or other feature), to be individually and independently set, thereby accounting for any movement, warping, or irregularities introduced to the pins (or other features) of the extrusion die 102 on a pin-by-pin basis, e.g., due to preceding manufacturing steps. In contrast, prior techniques such as wire EDM and abrasive wheel slitting, among others, simultaneously create the sides of entire rows of pins in a single action.

In some embodiments, the integrated vision system 106 provides for locating one or more die pins within the extrusion die 102 with an accuracy of 0.003 mm (3 micron) or more accurate, with an accuracy of 0.002 mm (2 micron) or more accurate, or with an accuracy of 0.001 mm (1 micron) or more accurate.

The tool dimeansion analyzer 108 can be configured to measure the length and/or radius of the micro-cutting tool 120 currently secured within the spindle 122 and can provide this micro-cutting tool dimension data to the controller 110. In one embodiment, the tool dimension reader 108 is implemented by at least some of the same components, e.g., sensors, of the integrated vision system 106. For example, similar to the vision system 106, the tool dimension reader 108 can include optical cameras, laser sensors, etc. to determine the dimensions of the micro-cutting tool 120.

The controller 110 can be operatively coupled to components of the micro-milling apparatus 100, including the micro-milling machine 104, the spindle motor (not shown) operable to rotate the spindle 122, the integrated vision system 106, and/or the tool dimension analyzer 108 via a wired or wireless communication connection or network.

The controller 110 can be a general purpose computer and comprise a microprocessor or other suitable computer processor or CPU (central processing unit) capable of executing computer-readable instructions/software routines. As above, the controller 110 comprises or is in data communication with the memory 112 and for storing computer readable instructions/software routines executable thereon. Die feature (e.g., pin) mapping information and other relevant information for specific extrusion dies 102 can be stored in the memory 112 of the controller 110 or optionally in a remote database in communication with the controller 110 (e.g., via wired or wireless communication, such as at a remote or cloud-computing server over a local network or the Internet).

The controller 110 can process location data provided by the integrated vision system 106 (e.g., the die feature location map) and micro-cutting tool dimension data from the tool dimension analyzer 108, as well as other user-provided or sensor-gathered information regarding the micro-milling operations, to generate a numerical control file for a specific extrusion die 102 to be micro-milled. The numerical control file can be used to define a cutting path for the micro-cutting tool 120 with respect to the mapped geometries of each extrusion die feature in comparison to the desired machined geometry. In this way, each pin can be precisely machined to a precise desired geometry independently of the machining of the other pins. For example, the numerical control file can set movement instructions, e.g., via any of the coordinate systems discussed herein, to control the movement of the tool arm 118 relative to the mapped features of the extrusion die 102, and thus the application of the micro-cutting tool 120 to components (e.g., die pins) of the extrusion die 102 currently secured within the workpiece holding device 116.

The numerical control file can comprise additional data useful for the automated application of the micro-cutting tool 120 to a component of the extrusion die 102. For example, this data can comprise a total number of die pins on the extrusion die 102, radius values for die pin corners, total depth of the step cut or other cuts to be made in the die pins, current die pin centroid x-axis value, current die pin centroid y-axis value, identification of current die pin being processed, the x-axis and y-axis coordinates for all side surfaces of each die pin (or peripheral die pins for step cuts), and/or one or more a micro-cutting tool paths useful for the micro-milling of one or more specific geometric features on one or more die pins.

The memory 112 can be part of or connected to the controller 110, such as over a wired or wireless signal connection or communication network. The memory 112 can comprise a database or otherwise store and/or retrieve numerical control file data and any other information necessary to implement a micro-milling operation on a specific extrusion die 102.

Figure 3A:
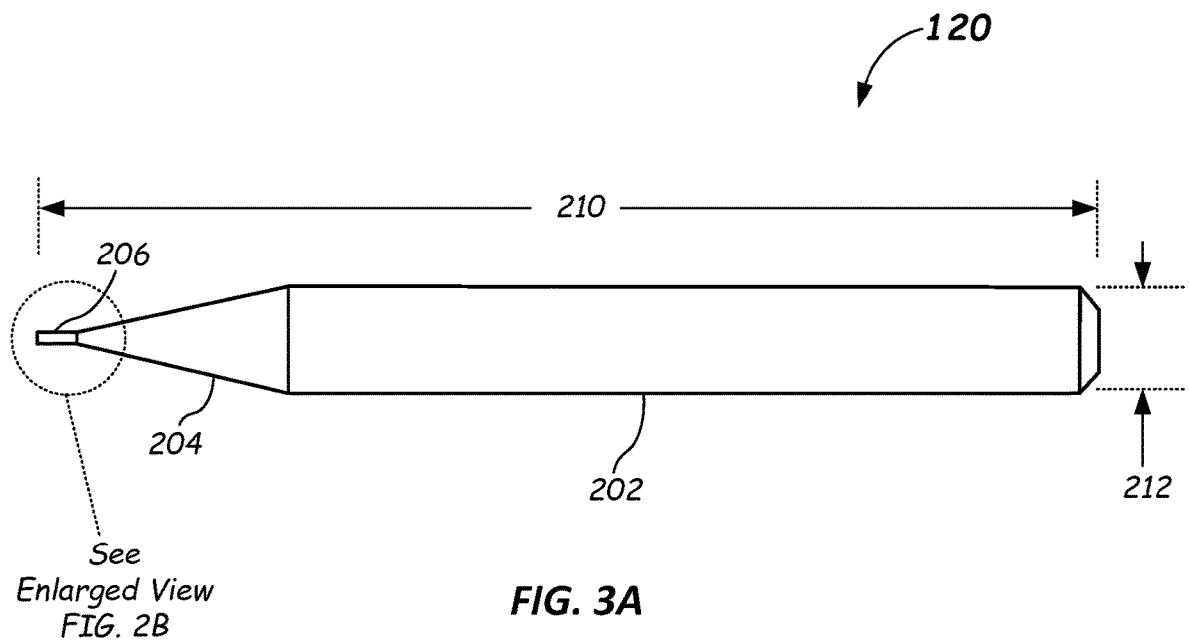
FIG. 3A schematically illustrates a side view of a micro-cutting tool used in a micro-milling machine to manufacture a honeycomb extrusion die according to embodiments of the disclosure.
Figure 3B:
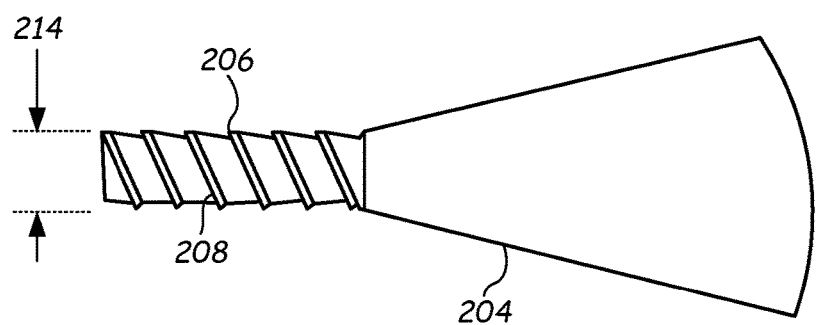
FIG. 3B schematically illustrates an enlarged partial side view of a micro-cutting tool according to embodiments of the disclosure.

FIGS. 3A and 3B schematically illustrate side plan views of a micro-cutting tool 120 used in the micro-milling machine 104 to manufacture an extrusion die 102 according to embodiments disclosed of the disclosure. The micro-cutting tool 120 comprises a shaft portion 202, a tapered portion 204 if applicable, and a cutting portion 206.

The shaft portion 202 can be that portion of the micro-cutting tool 120 that is secured in the spindle 122. The tapered portion 204 and the cutting portion 206 extend beyond the spindle 122 from the shaft portion 202. In order to increase rigidity and therefore reduce deflection of the cutting portion 206 when engaged against the surface of the extrusion die 102, the shaft portion 202 can be significantly thicker than the cutting portion 206. In such embodiments, the tapered portion 204 is included to provide for a transition between the differing diameters of the shaft portion 202 and the cutting portion 206. The cutting portion 206 is that portion of the micro-cutting tool 120 that is actually applied to the components (e.g., die pins) of the extrusion die 102 that are micro-milled. For example, one or more of the side surfaces of die pins defining the slots within the extrusion die 102 can be micro-milled.

As shown in FIG. 3A, the micro-cutting tool 120 can be dimensioned to a have tool length 210 and shaft diameter 212. In some embodiments, the micro-cutting tool 120 has a ratio of tool length 210 to shaft diameter 212 of up to 50 to 1.

As shown in the enlarged view of FIG. 3B, the cutting portion 206 comprises multiple milling flutes 208. The cutting flutes 208 can be spaced apart and can be spiraling in a manner that creates a cutting edge running along a length of the cutting portion 206. In some embodiments, the number of milling flutes 208 can range from 2 to 6 flutes, for example.

In some embodiments, the micro-cutting tool 120 is made from a single carbide metal. Alternatively, the micro-cutting tool 120 can be made from an alloy or combination of multiple carbide metals. Moreover, in some embodiments, an outer surface of the cutting portion 206 can be coated with one or more layers of a reinforcing material, such as, for example, titanium nitride (TiN), titanium aluminum nitride (TiAlN), titanium carbon nitride (TiCN), and/or aluminum titanium nitride (AlTiN).

The cutting portion 206 can be dimensioned to have a cutting diameter 214. As used herein, micro-cutting tool 120 is defined as a milling cutter having a cutting diameter Dc of the cutting portion that is less than or equal to 0.90 mm. In some embodiments, the cutting diameter Dc can be less than or equal to 0.61 mm, or less than or equal to 0.30 mm in some embodiments. In some embodiments, the micro-cutting tool 120 is a milling cutter having a cutting diameter Dc of the cutting portion that is 0.10 mm Dc≤0.90 mm, and can be from 0.10 mm Dc≤0.61 mm in some embodiments. In the case of manufacturing a geometrical feature into an extrusion die that already contains slots formed therein, the micro-cutting tool 120 can comprise a cutting diameter that is less than an initial slot width Ws of the extrusion die 102 to be micro-milled. In some embodiments, the cutting diameter 214 has a cutting diameter Dc that is a size reduction factor Fs that ranges from 99% to 65% of an initial width Ws of a slot within the extrusion die 102 that is to be micro-milled by the micro-cutting tool 120. For example, the cutting diameter Dc can be expressed by the equation 1 below:

$$Dc = Ws \times Fs \qquad \text{Eqn. 1}$$

In FIG. 3B, the cutting portion 206 is shown with a flat end. In some embodiments, the cutting portion 206 comprises a shaped end, a square-shaped end, a ball-shaped end, or a radius-shaped end. Thus, other shaped features can be micro-milled on one or more sides of one or more die pins or in the extrusion die 102.

Figure 4:
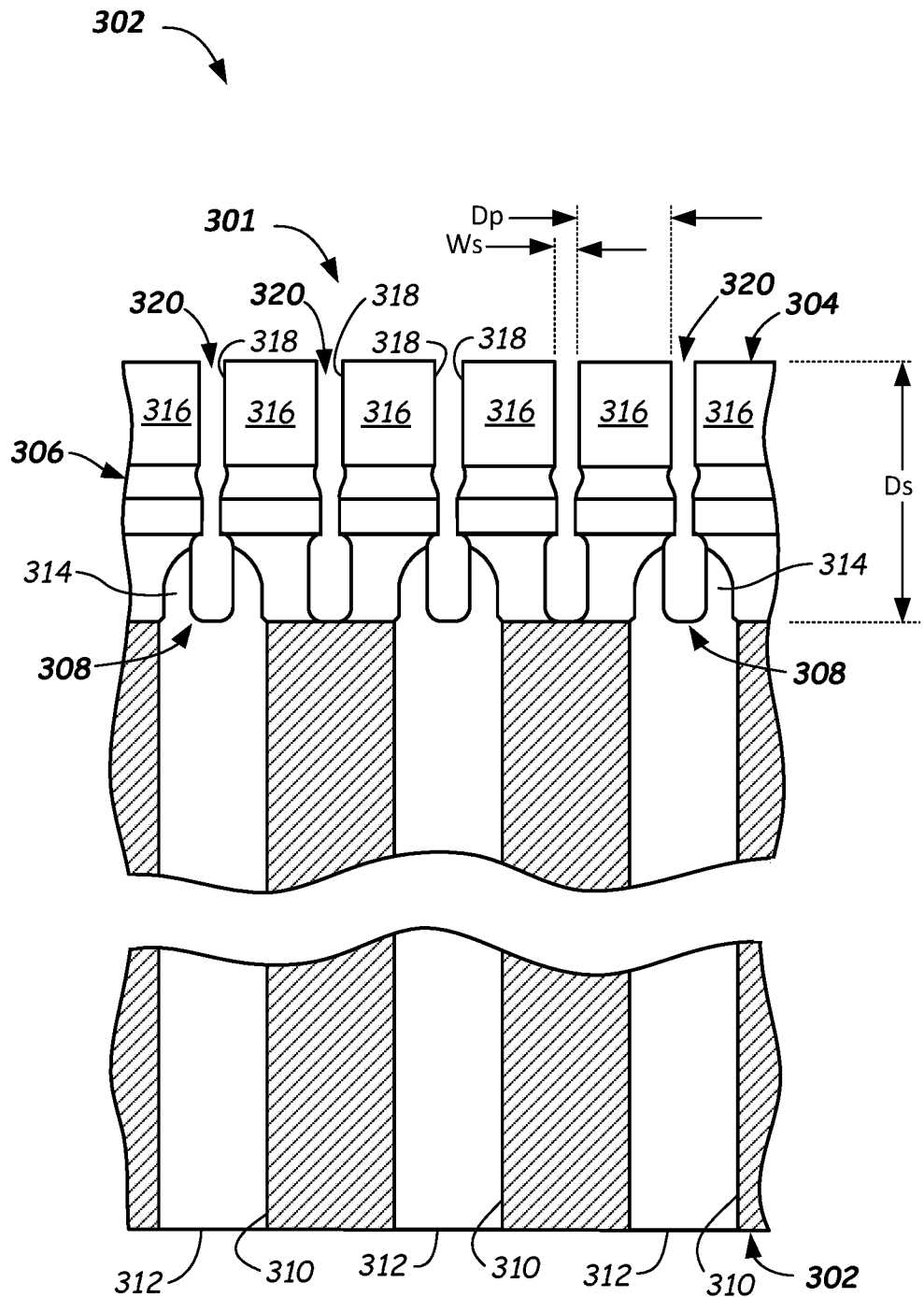
FIG. 4 schematically illustrates a cross-sectioned side view of a honeycomb extrusion die with die pins and slots according to embodiments of the disclosure.

FIG. 4 schematically illustrates a cross-sectioned side view of a honeycomb extrusion die 302 with die pins 316 and slots 320 that are to be micro-milled and modified according to embodiments of the disclosure. Similar to the extrusion die 152, it is to be understood that the extrusion die 302 is merely one specific example of the extrusion die 102, and thus, any description of the extrusion die 102 generally applies to the extrusion die 302. Likewise, potential features, components, and details that can be implemented in or by the extrusion die 102 can be better appreciated in view of the description of the extrusion die 302. For example, other embodiments of the extrusion die 102 can comprise any combination of features from the extrusion dies 152 and 302.

In one embodiment, the extrusion die 302 comprises an inlet face 301 located opposite an outlet face 304. The extrusion die 302 further comprises a body component 306 extending between slot inlets 308 and the outlet face 304. The extrusion die 302 also comprises a plurality of feedholes 310 that comprise feedhole inlets 312 and feedhole outlets 314. A batch material enters the feedhole inlets 312 under pressure and is discharged into the slots 320 at the feedhole outlets 314.

Each of the slots 320 is formed between adjacent die pins 316. Each of the die pins 316 comprises one or more side surfaces formed thereon 318. In some embodiments, the die pins 316 have a transverse dimension Dp across respective opposing sides that can range from 0.508 mm to 2.54 mm.

The die pins 316 can be arranged so that the side surfaces 318 between the die pins 316 form the plurality of slots 320 (a few labeled). The die pins 316 can comprise four side surfaces forming square-shaped die pins 316 (e.g., as also discussed with respect to the side surfaces 164 of the pins 154 of the extrusion die 152). In some embodiments, the slots 320 have widths Ws ranging from 0.0508 mm to 0.889 mm.

The slots 320 intersect with the feedhole outlets 314 of the feedholes 310 and extend to the outlet face 304. During extrusion, a batch material flows through the slots 320 and forms intersecting walls when the batch material exits the extrusion die 102 at the outlet face 304. In some embodiments, the slots 320 have a slot depth Ds that ranges from 0.127 mm to 12.7 mm.

In the embodiment depicted in FIG. 4, the die pins 316 are square-shaped. The square-shaped die pins 316 form slots 320 that extend along the outlet face 304 in a first direction and in a second direction perpendicular thereto. In other embodiments, the die pins 316 have different shapes in transverse cross-section, such as other straight slot geometries or non-straight slot geometries including triangular, rectangular (non-square), hexagonal, octagonal, diamond, parallelogram, other convex polygons, and the like.

As described above, the slots 320 are formed by adjacent side surfaces 318 of adjacent die pins 316. Contours formed, for example, by bending caused by machining or internal stresses, on the side surfaces 318 of the die pins 316 may cause the widths of the slots 320 to vary over their lengths, or from one slot to another. This can undesirably change the flow characteristics of the batch material being extruded through the slots 320. Further, the slots 320 can be formed to comprise certain contours therein that can comprise precision geometric features. These precision geometric features may desirably change the flow characteristics of the batch material through the slots 320.

In one embodiment, the precision geometric features comprises step cuts formed in the one or more side surfaces of at least some of the pins. The step cuts can be used to increase the slot width being the pins in which the step cuts are made. In some embodiments, the step cuts are not applied to each pin, but instead only to pins located in a specific pattern or region on the die. For example, the step cuts can be used to create a "halo" feature for the extrusion die (and/or for the honeycomb structure produced from the extrusion die). That is, a "halo" can refer to a portion of the die in a peripherally outer region adjacent to the outer perimeter of the die (thereby the region resembling a ring, or halo, for circular-shaped dies) within which region the slots 320 have a larger slot width than the width of the slots 320 at an interior portion of the die positioned within the outer region. For example, the halo feature can be provided by widening the slots adjacent to a selected number of the outermost pins of the extrusion die, e.g., for the pins corresponding to the outermost 1 to 20 cells of the honeycomb body formed by the extrusion die. Thus, the halo feature on an extrusion die can involve a corresponding number of pins, e.g., 1 to 20 of the die pins 316 of the extrusion die 102 located radially inward from the outer periphery of the die.

Figure 5A:
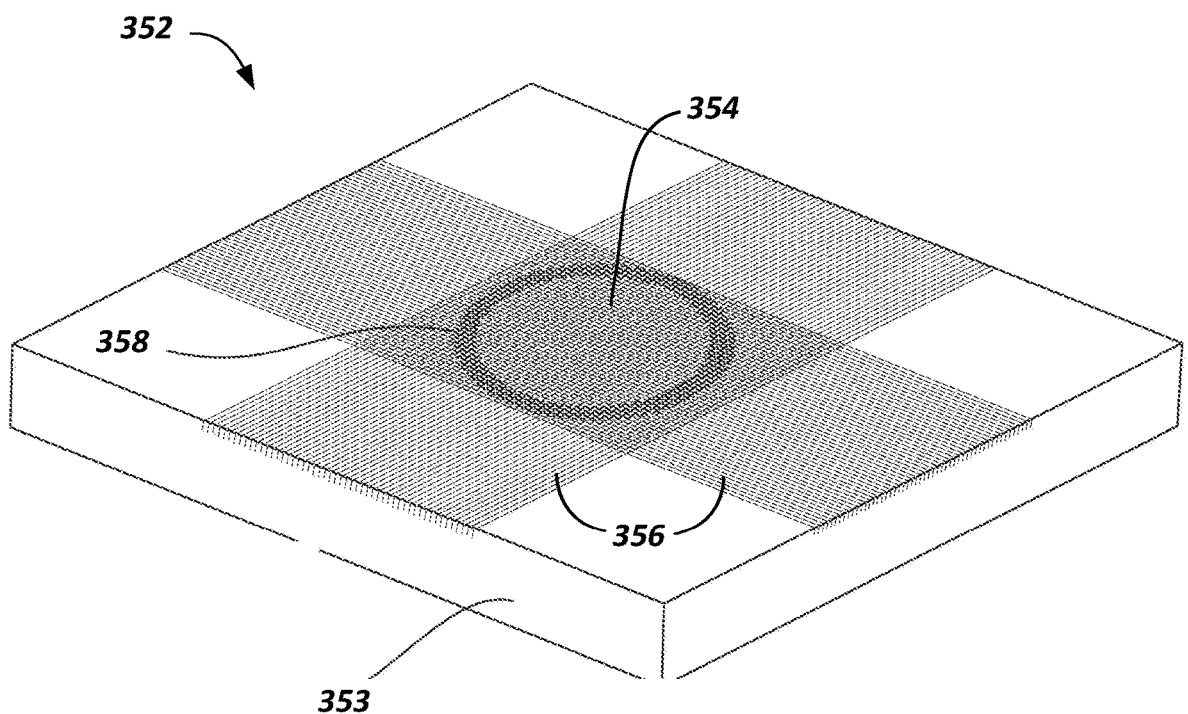
FIG. 5A schematically illustrates a perspective view of an extrusion die having a halo feature in which the width of slots in a ring-shaped region are wider than the width of the slots outside of the ring-shaped region.
Figure 5B:
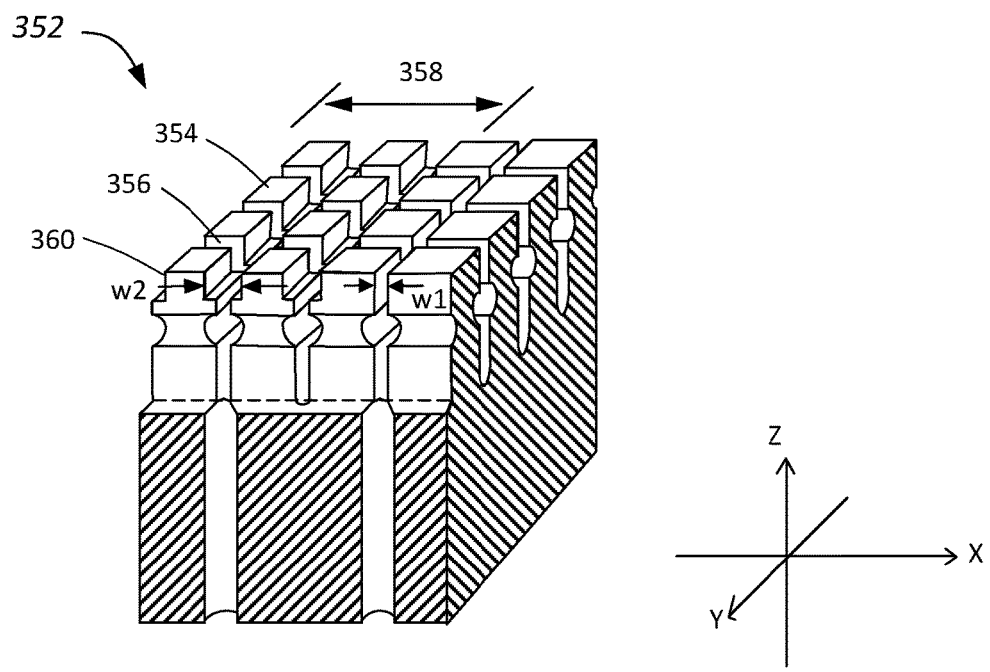
FIG. 5B schematically illustrates a cross-sectional view of an extrusion die, e.g., the extrusion die from FIG. 5A, comprising a plurality of pins having step-cuts (e.g., the pins in the ring-shaped region of FIG. 5A) for increasing the width of slots adjacent to the step-cut pins.

For example, an extrusion die 352 is illustrated in FIGS. 5A and 5B. Similar to the extrusion dies 152 and 302, it is to be understood that the extrusion die 352 is merely one specific example of the extrusion die 102, and thus, any description of the extrusion die 102 generally applies to the extrusion die 352. Likewise, potential features, components, and details that can be implemented in or by the extrusion die 102 can be better appreciated in view of the description of the extrusion die 352. For example, other embodiments of the extrusion die 102 can comprise any combination of features from the extrusion dies 152, 302, and 352.

More specifically, the extrusion die 352 is illustrated as an extrusion die precursor, that is, comprising a die blank 353 in an unfinished or intermediate state. Portions of the die blank 353 can be removed to complete manufacture of the extrusion die 352. The extrusion die 352 comprises a plurality of pins 354 and a plurality of slots 356 separating the pins 354. The extrusion die 352 also comprises a region 358 in which some of the pins 354 and the slots 356 are positioned. The slots 356 outside of the region 358 have a slot width w1, while the slots 356 in the region 358 having a step-widened slot width w2 that is wider than the slot width w1, as shown more clearly in FIG. 5B. As discussed herein, the step-widened slot width w2 can be formed by making step cuts 360 into the side surfaces of corresponding ones of the pins 354 (and/or certain side surfaces of the pins 354) located within the region 358.

In some embodiments, the extrusion die 102 comprises die pins (e.g., pins 154, 316, 354, etc.) that are modified using the micro-milling machine 104, but that are initially manufactured using standard manufacturing techniques including wire and/or plunge EDM. Alternatively, the extrusion die 102 can be manufactured using solely the micro-milling machine 104 without the use of other manufacturing techniques including wire and plunge EDM.

Figure 6:
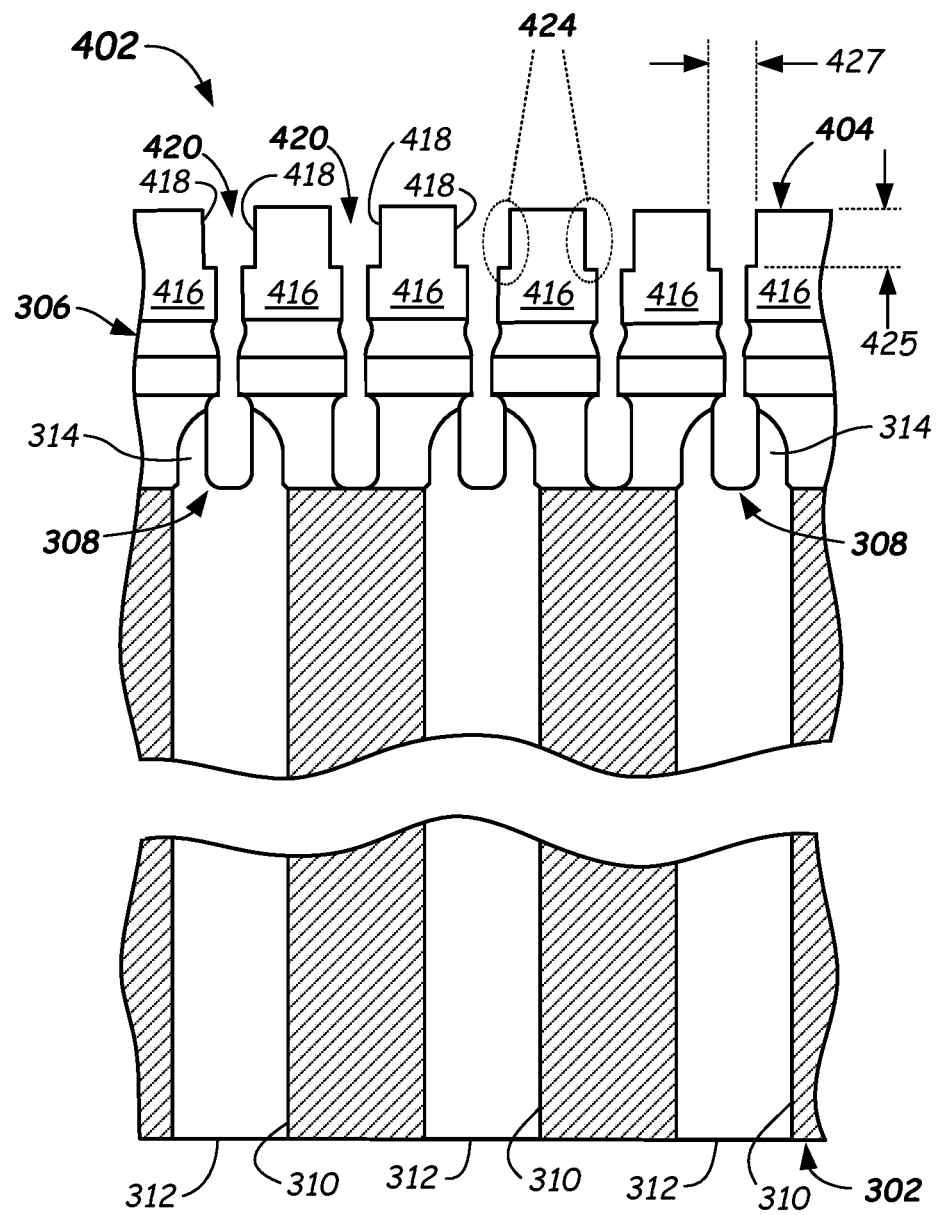
FIG. 6 schematically illustrates a cross-sectioned side view of a honeycomb extrusion die with die pins and slots that have been manufactured according to one embodiment of the disclosure.

FIG. 6 schematically illustrates a cross-section view of a honeycomb extrusion die 402 with die pins 416 and slots 420 that have been manufactured according to one embodiment of the disclosure. Similar to the extrusion dies 152 and 302, it is to be understood that the extrusion die 402 is merely one specific example of the extrusion die 102, and thus, any description of the extrusion die 102 generally applies to the extrusion die 402. Likewise, potential features, components, and details that can be implemented in or by the extrusion die 102 can be better appreciated in view of the description of the extrusion die 402. For example, other embodiments of the extrusion die 102 can comprise any combination of features from the extrusion dies 152, 302, and 402.

The extrusion die 402 has been micro-milled to add precise geometric features to the side surfaces 418 of the die pins 416. Specifically, step cuts 424 have been added to the side surfaces of each of the pins 416 to widen the slots 420 proximate the outlet face 404. The step cuts 424 can be provided on pins 416 located on a selected number of pins in a specified pattern or region, e.g., radially outer region of the die body to create a "halo" for the extrusion die as discussed above. The step cuts 424 have been machined onto each the die pins 416 shown by the application of the rotating micro-cutting tool 120 under control of the tool arm 118. Specifically, the rotating micro-cutting tool 120 has been applied to the side surfaces 418 of each of the die pins 402 shown, which can be peripheral die pins of the extrusion die 402. The micro-cutting tool 120 can make a single pass or multiple passes across the side surface 418 of the die pins 416 to create the step cuts 424. The number of passes used can depend on multiple factors including the shape of the added precise geometric feature, the amount of material to be removed from the side surfaces 418, the size of the slot and the size of the micro-cutting tool 120.

The step cut 424 machined onto each of the die pins 416 shown has a defined step depth 425 and a defined step-widened slot width 427. The ratio of step depth 425 to step-widened slot width 427 can be kept constant across all the slots 420 in a designated region of the extrusion die. In some embodiments, the ratio of step depth 425 to step-widened slot width 427 is greater than five and, more particularly, the ratio of step depth 425 to step-widened slot width 427 is approximately six.

In FIG. 6, the step cut 424 in each of the slots 420 are shown as having the same step depth 425 and step-widened slot width 427. Alternatively, the step cut 424 in each of the slots 420 can have a different step depth 425 and/or a different step-widened slot width 427. For example, the step-widened slot width 427 can be different for different slots or portions of a particular slot 420. For example, the step-widened slot width 427 can be made larger as the slot 420 progresses towards the periphery of the die body, such as at or near the skin-forming region. In some embodiments, the step depth 425 can range from 0.127 mm to 3.175 mm. The step-widened slot width 427 can range from 0.00254 mm to 0.254 mm. Other precise geometric features, other than step cuts 424, can be micro-milled on the die pins 416. For example, one or more of the following can be micro-milled on the die pins 416: a corner radius, a corner chamfer or fillet, divots, plenums, an asymmetric die pin feature, non-straight slot configurations, and the like. Such micro-milling can be performed at a radially inner region of the outlet face of the die, or at the interface with the skin-forming region, or both. Micro-milling can be performed to remove a bending-induced curvature on a previously-produced pin. In other example, the micro-milling can be used to open a dimension of slot to a desired slot width ranging from 0.508 mm to 0.889 mm, and the like. In some embodiments, such as in a non-straight slot extrusion die having some large and some small cross-sectional area channels, the micro-milling is performed to remove all side surfaces of the pins that will form the small cross-sectional area channels.

Figure 7:
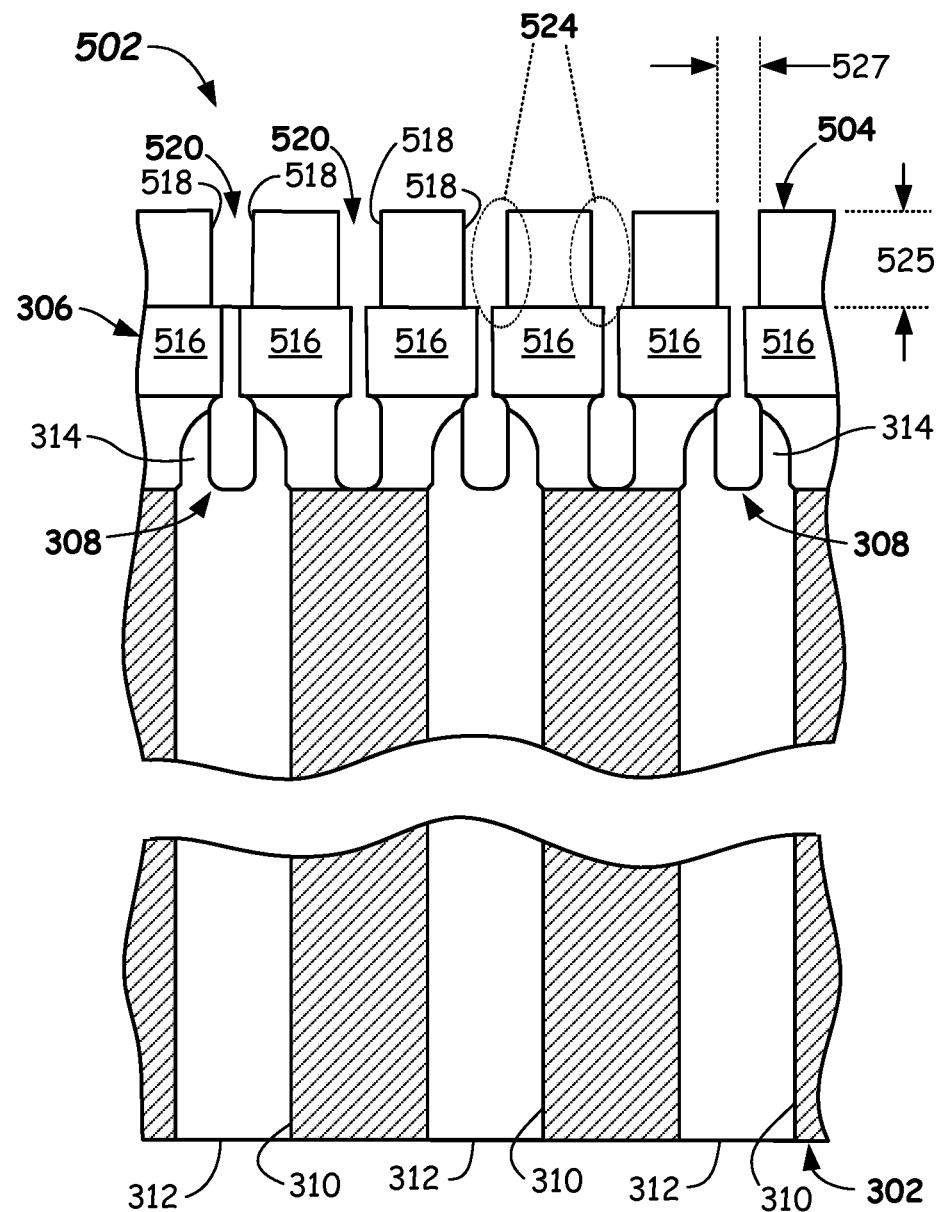
FIG. 7 schematically illustrates a cross-sectioned side view of a honeycomb extrusion die with die pins and slots that have been manufactured according to another embodiment of the disclosure.

FIG. 7 schematically illustrates a cross-sectional view of a honeycomb extrusion die 502 with die pins 516 and slots 520 that have been manufactured according to another embodiment of the disclosure. Similar to the extrusion dies 152, 302, and 402, it is to be understood that the extrusion die 502 is merely one specific example of the extrusion die 102, and thus, any description of the extrusion die 102 generally applies to the extrusion die 502. Likewise, potential features, components, and details that can be implemented in or by the extrusion die 102 can be better appreciated in view of the description of the extrusion die 502. For example, other embodiments of the extrusion die 102 can comprise any combination of features from the extrusion dies 152, 302, 402, and/or 502. In this embodiment, a step cut 524 has been locally added to each of the slots 520 proximate the outlet face 504 in a manner that provides for a greater step depth 525.

The step cut 524 has been machined onto each the die pins 516 by the application of the rotating micro-cutting tool 120 under control of the automatic tool change arm 118 to the side surfaces 518 of each of the die pins 516.

With the greater step depth 525, the ratio of step depth 525 to step-widened slot width 527 can still be kept constant across all the slots 520. As with other embodiments, the ratio of step depth 525 to step-widened slot width 527 can be greater than five and, more particularly, the ratio of step depth 525 to step-widened slot width 527 can be approximately six.

In FIG. 7, the step cut 524 in each of the slots 520 is shown as having the same step depth 525 and step-widened slot width 527. Alternatively, the slots 520 can be customized such that each slot 520 has a different step depth 525 and/or a different step-widened slot width 527.

Figure 8:
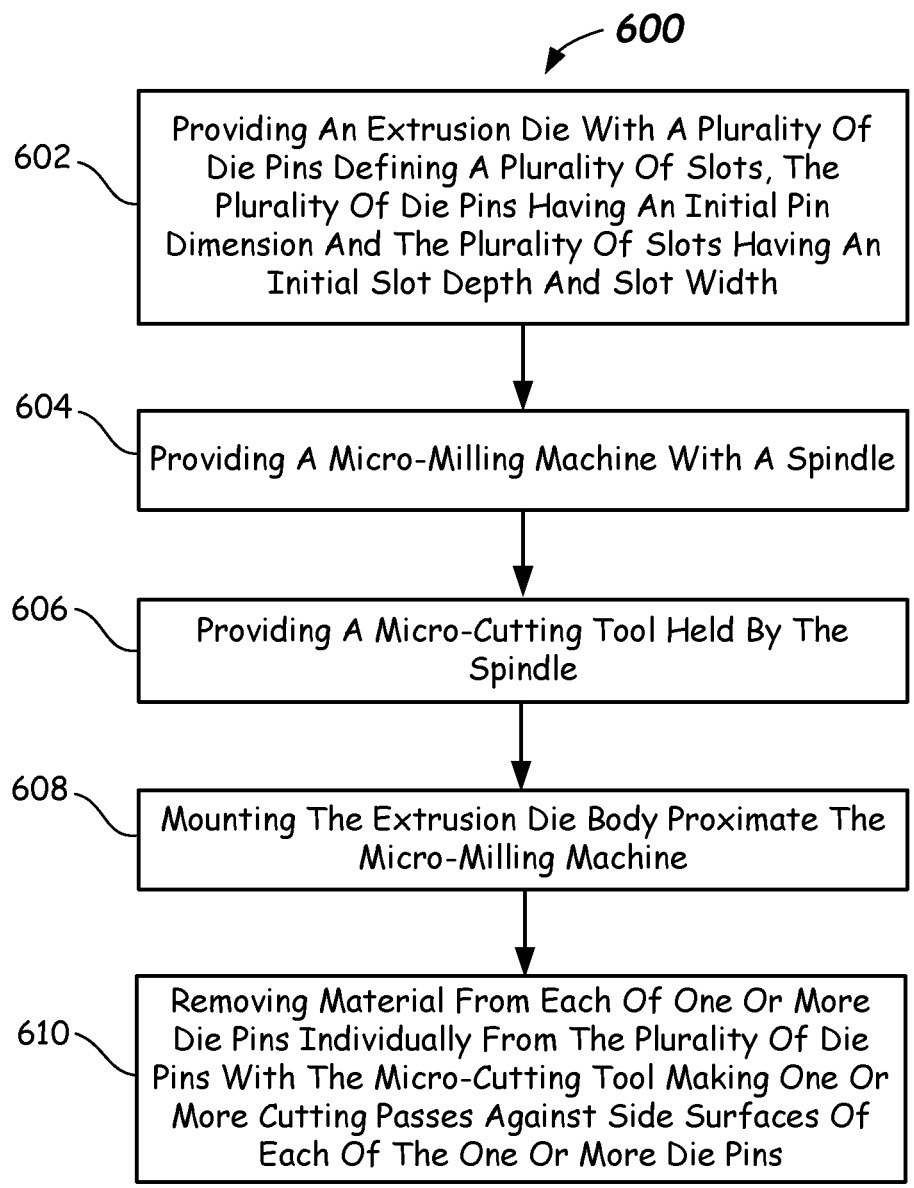
FIG. 8 illustrates a flowchart of a method of manufacturing a honeycomb extrusion die according to embodiments of the disclosure.

FIG. 8 illustrates a method 600 of manufacturing a honeycomb extrusion die according to embodiments disclosed herein. The method 600 comprises, at step 602, providing an extrusion die body (e.g., extrusion die 102, 302, 402, 502) with a plurality of die pins (e.g., plurality of die pins 316, 416, 516) defining a plurality of slots (e.g. plurality of slots 320, 420, 520), the plurality of die pins (e.g., plurality of die pins 316, 416, 516) having an initial die pin dimension and the plurality of slots having an initial slot depth and slot width. The method 600 comprises, at step 604, providing a micro-milling machine (e.g., micro-milling machine 104) with a spindle (e.g., spindle 122). The method 600 comprises, at step 606, providing a micro-cutting tool (e.g., micro-cutting tool 120) held by the spindle (e.g., spindle 122). The method 600 comprises, at step 608, mounting the extrusion die body (e.g., extrusion die 102) proximate the micro-milling machine (e.g., micro-milling machine 104). The method 600 comprises, at 610, removing material from each of one or more die pins (e.g., die pins 316, 416, 516) individually from the plurality of die pins (e.g., plurality of die pins 316, 416, 516) with the micro-cutting tool (i.e., micro-cutting tool 120) making one or more cutting passes against side surfaces (e.g., side surfaces 318, 418, 518) of each of the one or more die pins (e.g. one or more die pins 316, 416, 516). As discussed above, step 610 in some embodiments comprises individually and independently machining each pin of an extrusion die have at least one thousand or more pins, e.g., utilizing a pin location map generated from the data collected by an integrated vision system.

Figure 9:
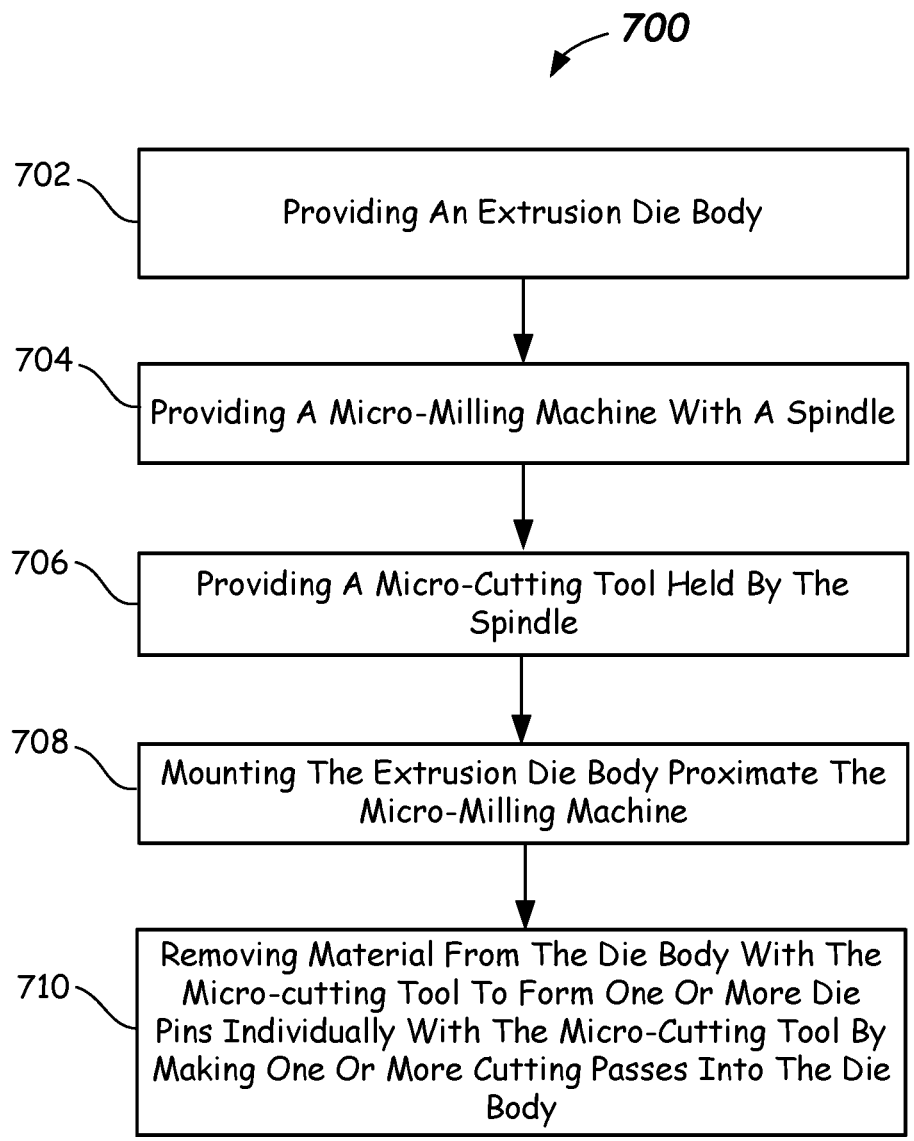
FIG. 9 illustrates a flowchart of another method of manufacturing a honeycomb extrusion die according to embodiments of the disclosure.

FIG. 9 illustrates a flowchart of another method of manufacturing a honeycomb extrusion die according to embodiments of the disclosure. The method 700 comprises, at step 702, providing an extrusion die body (e.g., a die body of extrusion die 102, 402, 502). The method 700 further comprises, at step 704, providing a micro-milling machine (e.g., micro-milling machine 104) with a spindle (e.g., spindle 122). The method 700 comprises, at step 706, providing a micro-cutting tool (e.g., micro-cutting tool 120) held by the spindle (e.g., spindle 122). The method 700 comprises, at step 708, mounting the extrusion die body (e.g., extrusion die body of extrusion die 102, 402, 502) proximate the micro-milling machine (e.g., micro-milling machine 104). The method 700 further comprises, at step 710, removing material from the extrusion die body (e.g., die body of extrusion die 102, 402, 502) with the micro-cutting tool (e.g., micro-cutting tool 120) to form one or more die pins (e.g., a plurality of die pins 316, 416, 516) individually with the micro-cutting tool (e.g., micro-cutting tool 120) by making one or more cutting passes into the extrusion die body (e.g., die body of the extrusion die 102, 402, 502).

Figure 10:
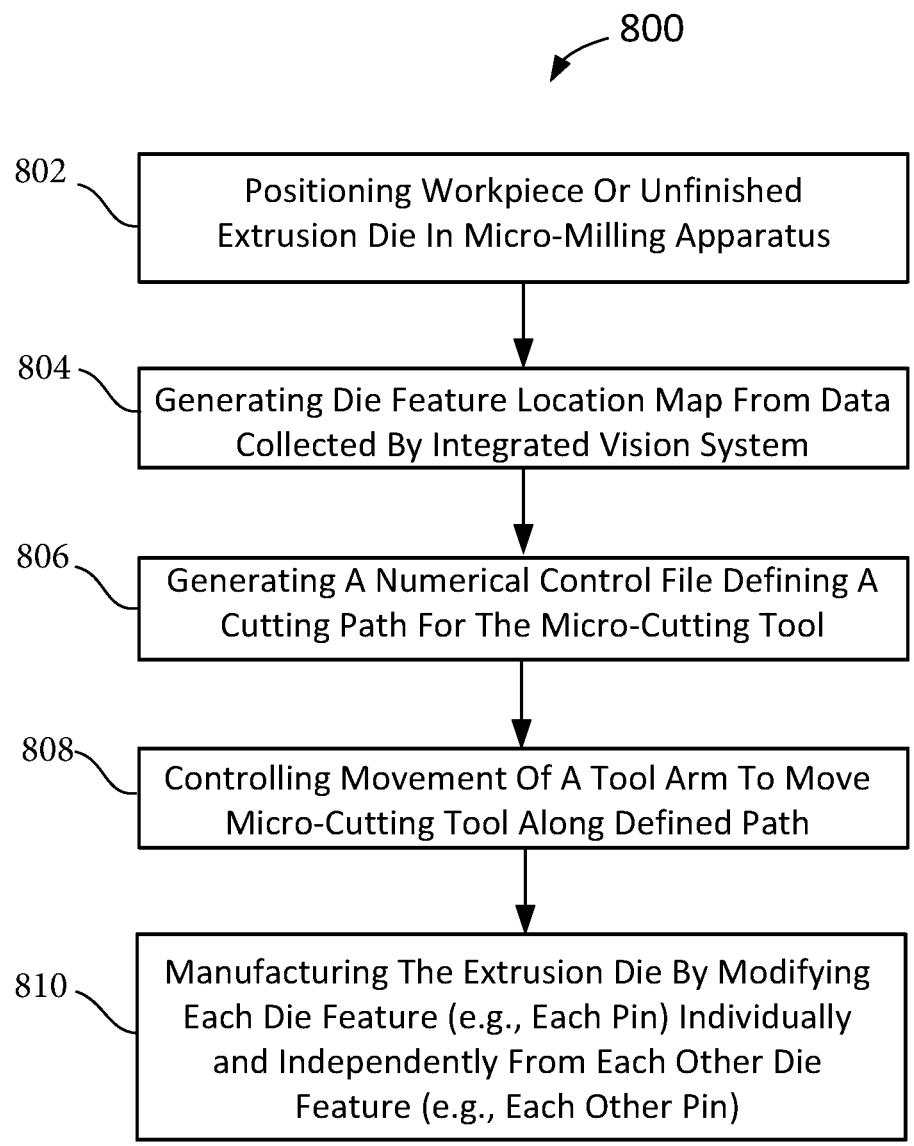
FIG. 10 illustrates a flowchart of another method of manufacturing a honeycomb extrusion die according to embodiments of the disclosure.

FIG. 10 illustrates a flowchart of a method 800 of manufacturing a honeycomb extrusion die according to embodiments of the disclosure. The method 800 comprises, at step 802, positioning a workpiece or unfinished extrusion die in a micro-milling apparatus (e.g., the micro-milling apparatus 100). The method 800 further comprises, at step 804 generating a die feature location map from data collected by an integrated vision system (e.g., a die pin location map in cardinal coordinates generated by data collected by sensors of the integrated vision system 106). The method 800 further comprises, at step 806, generating a numerical control file defining a cutting path for the micro-cutting tool (e.g., via the controller 110).

The method 800 further comprises, at step 808, controlling movement of a tool arm of the micro-milling apparatus to move the micro-cutting tool along the cutting path defined by the numerical control file (e.g., controlling movement of the tool arm 118 to move the micro-cutting tool 120 along the defined cutting path). The method 800 further comprises, at step 810, machining the extrusion die (e.g., the extrusion die 102, 152, 302, 402, 502) by modifying each die feature (e.g., the pins of the die) individually and independently of each other die feature in accordance with the cutting path defined by the numerical control file.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limited to the particular apparatus, assemblies, systems and/or methods disclosed, but, to the contrary, the intention is to cover all modifications, equivalents, and alternatives falling within the scope of the claims.

What is claimed is:

1. A micro-milling system for modifying an extrusion die comprising a plurality of die pins, comprising:
   a micro-milling machine comprising a micro-cutting tool coupled to a spindle of the micro-milling machine, the micro-milling machine further comprising a workpiece holding device configured to secure the extrusion die proximate the micro-cutting tool:
   an integrated vision system configured to capture location data of the plurality of die pins, the location data comprising at least one of angle, orientation, or length of each side surface of each die pin of the plurality of die pins; and
   a controller configured to generate a die pin location map using the location data, generate a numerical control file using the die pin location map, and control the micro-milling machine to guide the micro-cutting tool along a tool path generated from the numerical control file to machine the plurality of die pins one die pin at a time individually and independently of machining another die pin of the plurality of die pins.

2. The micro-milling system of claim 1, wherein the location data comprises a location of each die pin of the plurality of die pins, and wherein the location is determined with an accuracy equal to or less than 1 micron.

3. The micro-milling system of claim 1, wherein the micro-milling machine further comprises a tool arm connected to the micro-cutting tool and configured to move the micro-cutting tool with respect to the extrusion die.

4. The micro-milling system of claim 1, wherein the spindle is an air turbine spindle.

5. The micro-milling system of claim 1, wherein the spindle is a machine spindle.

6. The micro-milling system of claim 1, wherein the micro-cutting tool is rotatable at a rotation rate of at least 150,000 RPM.

7. The micro-milling system of claim 1, further comprising a memory containing design attributes applicable to specific extrusion dies.

8. A method of modifying an extrusion die, comprising:
   mounting an extrusion die in a micro-milling machine proximate a micro-cutting tool of the micro-milling machine, the micro-cutting tool coupled to a spindle of the micro-milling machine, the extrusion die comprising a plurality of die pins, each die pin of the plurality of die pins comprising a plurality of side surfaces;

collecting location data related to the plurality of die pins with an integrated vision system of the micro-milling machine, the location data comprising at least one of angle, orientation, or length of each side surface of each die pin of the plurality of die pins;

generating a die pin location map from the location data;

using the die pin location map to generate a numerical control file defining a cutting path for the micro-cutting tool of the micro-milling machine; and removing material from one or more die pins of the plurality of die pins using the micro-cutting tool, the micro-cutting tool making one or more cutting passes against the side surfaces of the one or more die pins to remove the material individually and independently from the one or more die pins one die pin at a time.

9. The method of claim 8, wherein the step of removing material further comprises removing material from side surfaces of the plurality of die pins.

10. The method of claim 8, wherein the spindle rotates the micro-cutting tool at a rotation rate that ranges from 150,000 RPM to 250,000 RPM.

11. The method of claim 8, wherein the plurality of side surfaces form a plurality of interconnecting slots, each slot of the plurality of slots comprising an initial slot width (Ws) before the step of removing the material, the micro-cutting tool comprising a cutting diameter in a range from 65% to 99% of the initial slot width (Ws).

12. The method of claim 8, wherein the material removed from the one or more die pins of the plurality of die pins creates a step cut in the one or more die pins.

13. The method of claim 12, wherein the step cut comprises a step depth in a range from 0.127 mm to 3.175 mm.

14. The method of claim 8, further comprising locating the plurality of die pins with an accuracy equal to or less than 1 micron.

15. The method of claim 8, wherein the extrusion die comprises at least one thousand die pins separated by a plurality of intersecting non-straight slots.

16. The method of claim 8, wherein the plurality of side surfaces form a plurality of interconnecting slots, each slot of the plurality of slots comprising an initial slot width (Ws) before removing the material from the one or more die pins of the plurality of die pins using the micro-cutting tool and a slot depth (Ds), and wherein the initial slot width (Ws) of each slot of the plurality of slots is in a range from 0.0508 mm to 0.889 mm and the slot depth (Ds) of each slot is in a range from 0.127 mm to 12.7 mm.

17. The method of claim 8, further comprising heating a portion of the extrusion die to weaken the portion prior to removing material from the portion.

18. The method of claim 8, wherein the step of removing the material further comprises rounding corners of the plurality of pins.

* * * * *